(12) United States Patent
Moschuk et al.

(10) Patent No.: US 8,326,487 B2
(45) Date of Patent: Dec. 4, 2012

(54) ESTIMATION OF WHEEL NORMAL FORCE AND VEHICLE VERTICAL ACCELERATION

(75) Inventors: Nikolai K. Moschuk, Grosse Pointe, MI (US); Flavio Nardi, Farmington Hills, MI (US); Jihan Ryu, Rochester Hills, MI (US); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1003 days.

(21) Appl. No.: 12/275,880

(22) Filed: Nov. 21, 2008

(65) Prior Publication Data

US 2010/0131154 A1    May 27, 2010

(51) Int. Cl.
*B60G 17/018* (2006.01)
(52) U.S. Cl. .......... 701/37; 701/38; 280/5.515
(58) Field of Classification Search ........... 701/38, 701/37
See application file for complete search history.

(56) References Cited

U.S. PATENT DOCUMENTS

| | | | |
|---|---|---|---|
| 5,696,677 A * | 12/1997 | Leaphart et al. | 701/37 |
| 6,208,920 B1 * | 3/2001 | Izawa et al. | 701/36 |
| 6,374,171 B2 * | 4/2002 | Weiberle et al. | 701/71 |
| 6,819,979 B1 * | 11/2004 | Schwarz et al. | 701/1 |
| 2008/0319609 A1 * | 12/2008 | Poilbout | 701/38 |

FOREIGN PATENT DOCUMENTS

WO    WO 2007034102 A1 *    3/2007

* cited by examiner

*Primary Examiner* — Mary Cheung
*Assistant Examiner* — Jerrah Edwards
(74) *Attorney, Agent, or Firm* — John A. Miller; Miller IP Group, PLC

(57) ABSTRACT

A method for estimating the normal force at a wheel of a vehicle and the vertical acceleration of the vehicle that has particular application for ride and stability control of the vehicle. The method includes obtaining a suspension displacement value from at least one of a plurality of suspension displacement sensors mounted on the vehicle and estimating a spring force acting on a spring of a suspension element of the vehicle, a damper force acting on a damper of the suspension element of the vehicle, and a force acting at a center of a wheel. The method further includes determining a normal force at the wheel of the vehicle and a vertical acceleration of the vehicle based on the spring force, the damper force and the force at the center of the wheel of the vehicle.

20 Claims, 6 Drawing Sheets

US 8,326,487 B2

ESTIMATION OF WHEEL NORMAL FORCE AND VEHICLE VERTICAL ACCELERATION

BACKGROUND OF THE INVENTION

1. Field of the Invention

This invention relates generally to a method for estimating the normal force at a wheel of a vehicle and the vertical acceleration of the vehicle and, more particularly, to a method for estimating the normal force at a wheel of a vehicle and the vertical acceleration of the vehicle for ride and stability control purposes.

2. Description of the Related Art

Continuous efforts are being made in the field of automotive industry to develop new technologies to make vehicle driving safe and comfortable. Recent developments for vehicle ride and stability control systems (VRSCS) have assisted in improving the comfort and safety of vehicles. In general, a VRSCS is an electronic control system that uses inputs from various sensors located on the vehicle and processes the information to generate a signal required for facilitating the ride comfort and the stability control of the vehicle. The normal force at a wheel and the vertical acceleration of a vehicle are two important parameters indicating whether the condition of the vehicle is comfortable and stable or unstable. Hence, constant monitoring of these parameters is imperative.

In one existing technology, the normal force at the wheel is calculated using the sprung mass of the vehicle. The sprung mass of a vehicle is the mass of the vehicle body and all the components supported by the suspension of the vehicle. Inertial sensors, such as lateral and longitudinal accelerometers, are used for this purpose and are affixed to the body of the vehicle. However, an accurate estimation of the normal force at a wheel using inertial sensors typically requires the estimation of vehicle weight and the location of its center of gravity. Further, devices, such as accelerometers, predominantly use low frequency to measure the wheel normal force as the high frequency originating from the wheel of the vehicle is generally washed out by the suspension of the vehicle. Thus, estimation of the normal force using inertial sensors installed in the sprung mass of the vehicle is typically inaccurate and not robust enough as it does not include wheel dynamics.

In one existing technology for estimating the vertical acceleration of a vehicle, a second order derivative of filtered suspension deflection sensor signals is taken as the vertical acceleration of the vehicle. However, the calculation of the second derivative of the suspension deflection signal requires heavy filtering of the signal of the suspension deflection sensors, which results in an unacceptable delay in estimating the vertical acceleration. This delay slows down the feedback process to a VRSCS in a real time environment, thus affecting the effectiveness of the VRSCS.

SUMMARY OF THE INVENTION

In accordance with the teachings of the present invention, a method for estimating the normal force at a wheel and the vertical acceleration of a vehicle is disclosed that has particular application for ride and stability control of a vehicle. The method includes obtaining a suspension displacement value from at least one of a plurality of suspension displacement sensors mounted on the vehicle and estimating a spring force acting on a spring of a suspension element of the vehicle, a damper force acting on a damper of the suspension element of the vehicle, and a force acting at a center of a vehicle wheel.

The method further includes determining the normal force at the wheel of the vehicle and the vertical acceleration of the vehicle based on the spring force, the damper force, and the force at the center of the wheel of the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for estimating the normal force at a wheel of a vehicle and the vertical acceleration of a vehicle is merely exemplary in nature, and is in no way intended to limit the invention or its applications or uses. For example, the method for estimating the normal force at a wheel and the vertical acceleration of a vehicle has application for facilitating the ride and stability control of the vehicle. However, as will be appreciated by those skilled in the art, the method for estimating the normal force at a wheel of a vehicle and the vertical acceleration of a vehicle of the invention may have other applications.

Figure 1:
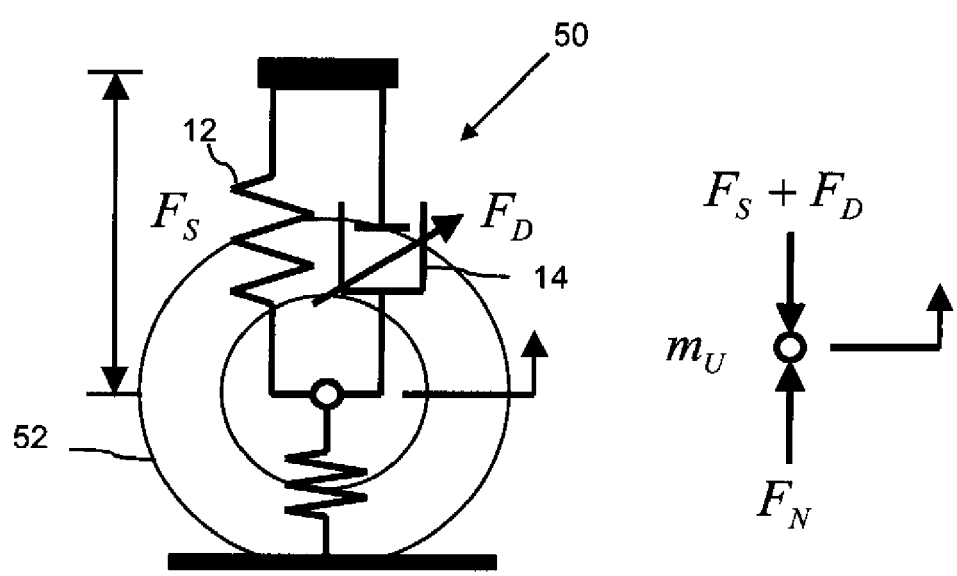
FIG. 1 illustrates a free body diagram showing the orientation of various forces acting on the wheel of a vehicle.

FIG. 1 is a free body diagram 10 illustrating the orientation of forces acting on a wheel 52 and a suspension assembly 50 of a vehicle, where $F_S$ is the spring force acting on a spring 12 of the suspension assembly 50, $F_D$ is the damper force acting on a damper 14 of the suspension assembly 50, $F_N$ is the normal force acting on the wheel 52, $m_U$ is the unsprung mass of the vehicle and $\ddot{z}$ is the acceleration of the center of the wheel 52. The unsprung mass $m_U$ of the vehicle is the mass of the suspension and all the components connected beneath the suspension, such as the rim and knuckle, rather than the mass of the components and body of the vehicle that are supported by the suspension. In other words, it is the mass of the vehicle not carried by the spring 12 and the damper 14 of the suspension assembly 50. The product of the unsprung mass $m_U$ with the acceleration of the center of the wheel $\ddot{z}$ is equal to the force at the center of the wheel 52. Further, the forces acting on the wheel 52 and the suspension assembly 50 can be represented by:

$$F_N = m_U \ddot{z} + F_S + F_D \qquad (1)$$

Equation (1) is used in the present invention to calculate the normal force at the wheel $F_N$ and the method for obtaining the parameters required for estimation of the normal force at a wheel $F_N$ of a vehicle as described below.

The vehicle is mounted with at least one suspension deflection sensor proximal to each suspension element. The suspension displacement sensor is used to measure the displacement of its corresponding suspension element. The displacement of the suspension is also known as the wheel center displacement and both terms are, hereinafter, used interchangeably. The value of the suspension displacement is used to estimate the values of the spring force $F_S$, the damper force $F_D$ and the acceleration of the center of the wheel $\ddot{z}$. The spring force $F_S$ is estimated using look-up tables or graphs that give a set of spring force values $F_S$ corresponding to a set of suspension displacement values. In an exemplary embodiment, the look-up table or the graph can be generated from the data obtained during a vehicle handling facility (VHF) test, such as shown by the graph in FIG. 5.

To conduct the VHF test, a test bench is specifically designed to measure various operating parameters of a vehicle in a variety of operating conditions. The test vehicle is mounted on a four corner stand and the stand is connected to a suspension and wheel assembly at each of the four corners. Further, a jounce bumper assembly is used in the vehicle, which is an elastic cushion made up of polymeric material and is used to strengthen the suspension as the suspension gradually approaches the end of its jounce travel. Jounce travel is the compression of the vehicle suspension while traveling over road irregularities, such as bumps and pits. The opposite motion of jounce is recoiling or springing back of the suspension and is known as rebound. Further, the test vehicle is fitted with various sensors and transducers to measure the various operating parameters. The VHF test is a quasi-steady test in which the vehicle is subjected to the various operating parameters needed to generate the required charts and graphs are recorded under a variety of operating conditions.

The calculation of the damper force $F_D$ is done in a manner similar to the calculation of the spring force $F_S$ and is as follows. First, a low-pass filter is used to filter out high frequency noise from the suspension deflection value. The filtered suspension displacement value is used to estimate a damper velocity. The damper velocity is calculated as the first order derivative of the filtered suspension displacement value with respect to time. Further, the damper force $F_D$ value for a corresponding damper velocity is provided by a graph or a look-up table. In one embodiment, the look-up table or graph showing the comparison between the damper force $F_D$ and the damper velocity can be generated from the data obtained during a damper bench test, such as the chart shown in FIG. 6. Thereafter, the force at the center of a wheel is calculated as the product of the unsprung mass $m_U$ of the vehicle and the acceleration of the center of the wheel $\ddot{z}$. The acceleration of the center of a wheel is obtained as the second order derivative of the suspension displacement value with respect to time.

The accurate estimation of the normal force at a wheel $F_N$ will assist the VRSCS to control the force variation between the wheel and the ground over high frequency road inputs and the brake/acceleration torque when the wheel hops, resulting in better ride and stability control.

Figure 2:
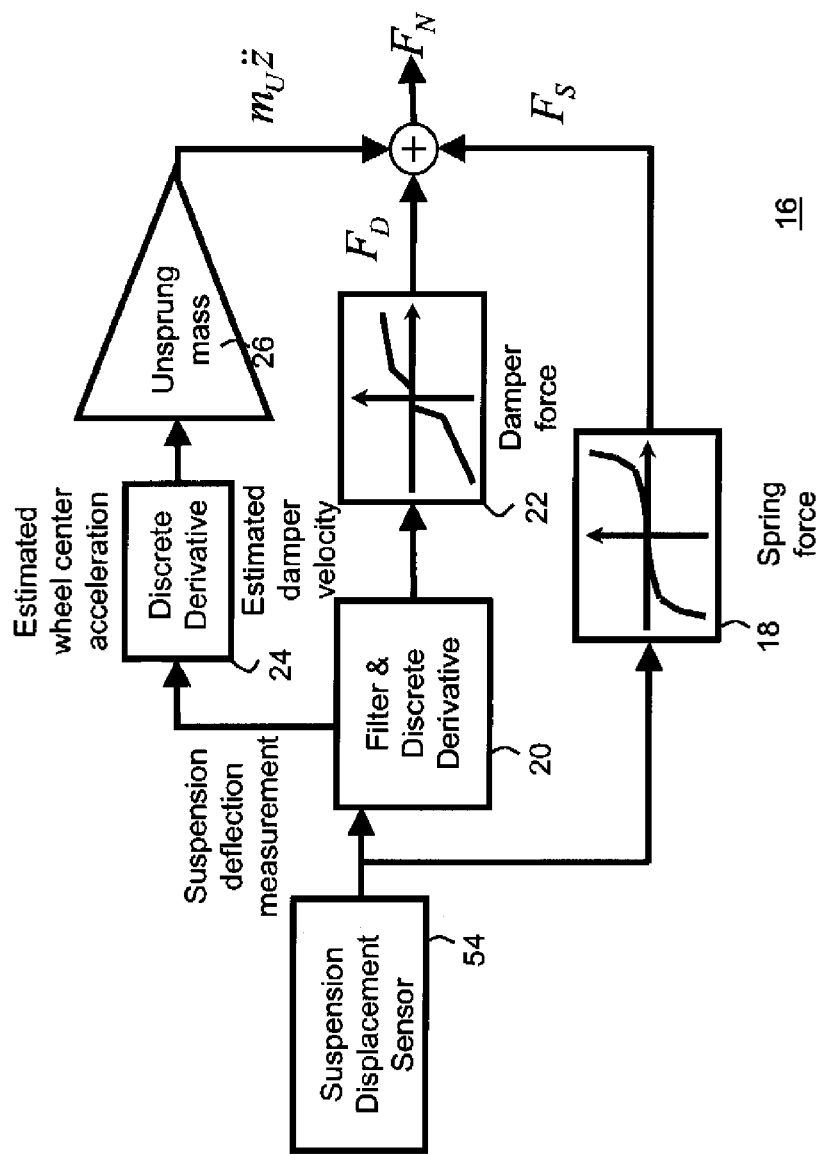
FIG. 2 is a block diagram illustrating a method for estimating the normal force at a wheel of a vehicle.

FIG. 2 is a block diagram 16 illustrating the estimation of the normal force $F_N$ at a wheel of a vehicle, according to one embodiment. An input from a suspension displacement sensor 54 is received at block 18 where it is used to estimate the spring force $F_S$ value, as described in FIG. 1. Simultaneously, the suspension displacement sensor input is received at block 20 where the input is first filtered to eliminate any noise present. Then a first order derivative of the filtered suspension displacement sensor input is calculated with respect to time to estimate the damper velocity. The calculated damper velocity is received at block 22 where the damper force $F_D$ corresponding to a damper velocity is estimated, as described in FIG. 1. The damper velocity value obtained at the block 20 is differentiated again with respect to time to obtain the acceleration of the center of the wheel $\ddot{z}$ at block 24. Further, the acceleration of the center of the wheel $\ddot{z}$ value is received at block 26 where the force at the center of the wheel is estimated, as described in FIG. 1. Finally, the spring force $F_S$, the damper force $F_D$, and the force at the center of the wheel obtained at the blocks 18, 22 and 26, respectively, are used to calculate the normal force at the wheel $F_N$.

Figure 3:
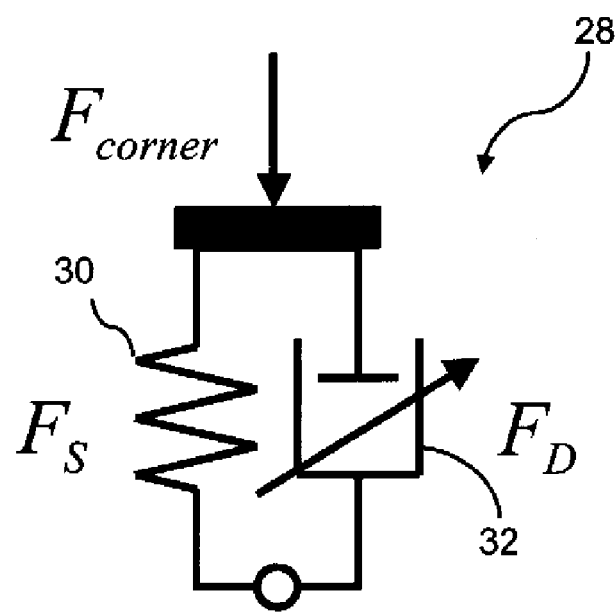
FIG. 3 illustrates a free body diagram showing the orientation of various forces acting on the suspension elements of a vehicle.

FIG. 3 is a free body diagram of a suspension assembly 28 illustrating the orientation of forces acting on the suspension assembly 28. The value $F_S$ is the spring force acting on a spring 30 of the suspension assembly 28, the value $F_D$ is the damper force acting on a damper 32 of the suspension assembly 28 and the value $F_{corner_i}$ is the corner force acting at one of the corners of the vehicle, i.e., at the top of the suspension elements of the vehicle. Therefore, the forces acting at each suspension element of a wheel, as shown in FIG. 3, can be represented as:

$$F_{corner_i} = F_S + F_D \qquad (2)$$

The corner forces acting at all of the four corners of the vehicle are calculated and used to obtain the vertical acceleration of the vehicle. The vertical acceleration of a vehicle can be obtained by:

$$m_{vehicle} a_z = -m_{vehicle} g + \sum_{i=1}^{4} F_{corner_i} \qquad (3)$$

Where $m_{vehicle}$ is the mass of the vehicle and g is the acceleration due to gravity and $a_z$ is the vertical acceleration of the vehicle.

A method for the estimation of vertical acceleration $a_z$ of a vehicle can use equation (3). The corner force $F_{corner_i}$ at each individual corner of the vehicle is estimated using equation (2). The estimation of the spring force $F_S$ and the damper force $F_D$ is described in FIG. 1. Further, the mass $m_{vehicle}$ of the vehicle is estimated using equation (3) when the vehicle is at a standstill condition. In the standstill condition, the vertical acceleration $a_z$ of the vehicle is zero and the sum of the corner force measurements divided by the acceleration due to gravity g will indicate the actual vehicle mass $m_{vehicle}$. Thus, by obtaining the various parameters used in equation (3), the vertical acceleration of the vehicle $a_z$ can be calculated.

The accurate estimation of the vertical acceleration of the vehicle $a_z$ will assist the VRSCS in controlling the low frequency heave motion of the sprung mass, resulting in better ride and stability control.

Figure 4:
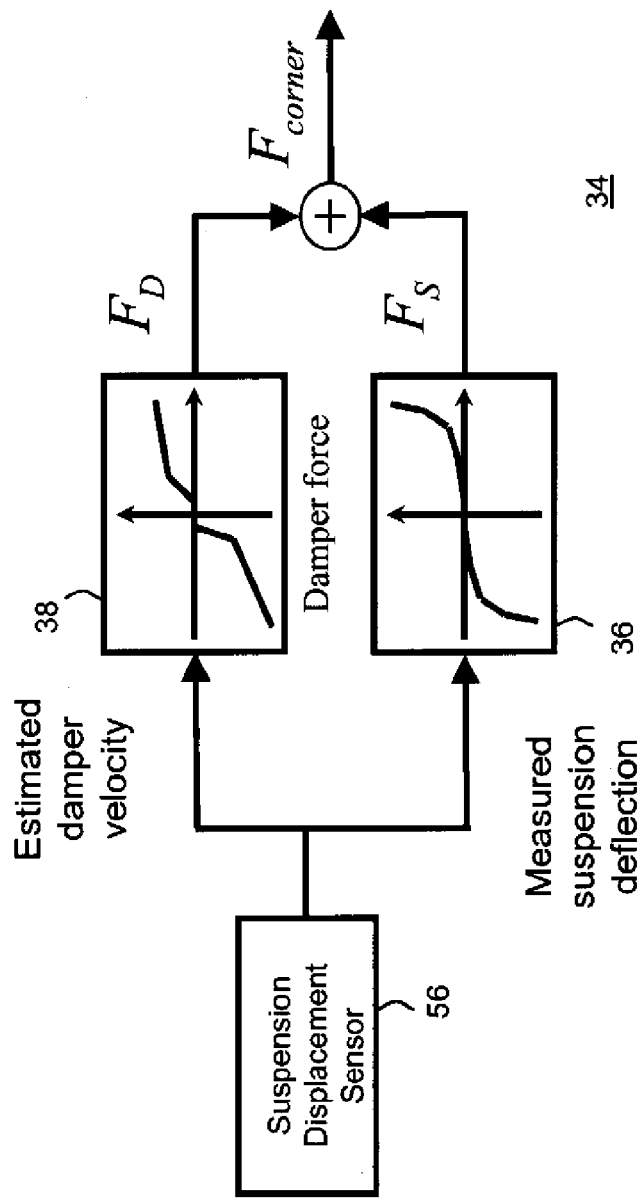
FIG. 4 is a block diagram illustrating a method to estimate force at one corner of a vehicle.

FIG. 4 is a block diagram 34 illustrating an estimation of the corner force $F_{corner_i}$ at each individual corner of the vehicle. An input from a suspension displacement sensor 56 is received at block 36 where it is used to estimate the spring force $F_S$ as described in FIG. 1. Further, the damper velocity, calculated in a manner as described in FIG. 2, is received at block 38 as an input, where the damper force $F_D$ is estimated as described above. Finally, the output obtained at the block 36 and the block 38, namely the spring force $F_S$ and the damper force $F_D$, respectively, are added to obtain the corner force $F_{corner_i}$ at one individual corner of the vehicle.

Figure 5:
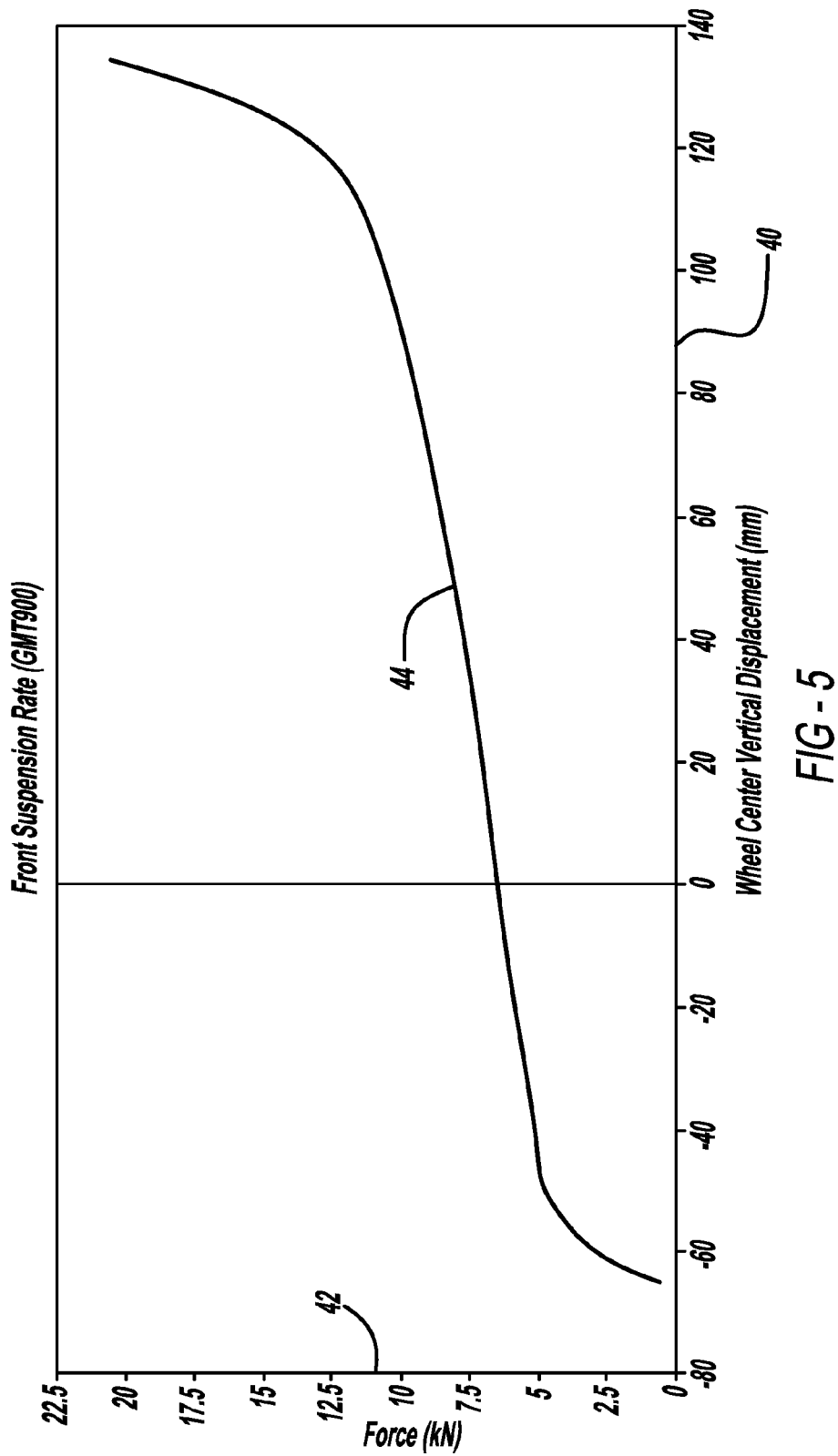
FIG. 5 illustrates an output chart of a vehicle handling facility (VHF) test depicting variation in spring force with a change in wheel center displacement of the corresponding invention.

FIG. 5 is an exemplary output chart of a VHF test depicting the variation of the spring force $F_S$ with a change in wheel center vertical displacement. In the chart, the X-axis 40 represents the wheel center suspension displacement in millimeters (mm) while the Y-axis 42 represents the spring force $F_S$ of the vehicle in Newtons (N). The solid line 44 represents the variation of spring force with wheel center vertical displacement.

Figure 6:
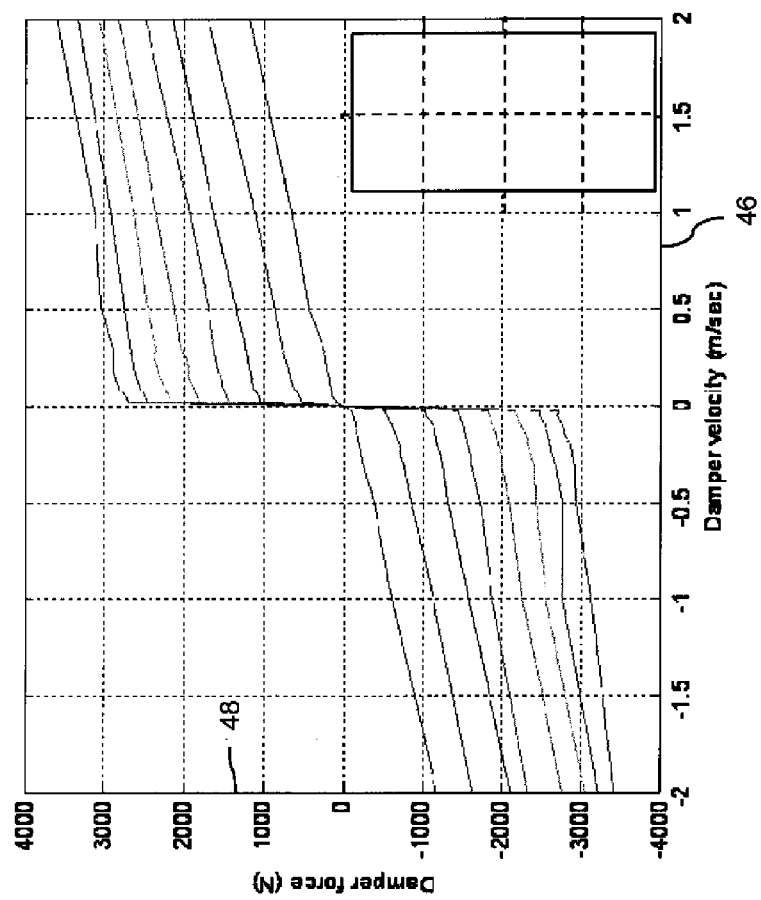
FIG. 6 illustrates an output chart of a damper bench test depicting a variation in the damper force with a change in damper velocity of the corresponding invention.

FIG. 6 illustrates an exemplary output chart of a damper bench test depicting the variation in the damper force $F_D$ with a change in damper velocity of the corresponding suspension element. In the chart, the X-axis 46 represents the damper velocity in m/sec and the Y-axis 48 represents the damper force $F_D$ of the vehicle in Newtons (N).

Various embodiments of the present invention offer one or more advantages. The present invention provides a method for estimating normal force at a wheel of a vehicle and vertical acceleration of a vehicle. The method of the present invention uses suspension displacement sensors to estimate the above mentioned two parameters, hence giving a more accurate input to the vehicle ride and stability control system leading to better ride, stability, traction and suspension control of the vehicle.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a normal force at a wheel of a vehicle, the vehicle comprising a plurality of suspension displacement sensors with each of the plurality of suspension displacement sensors positioned proximal to a suspension element of the vehicle, the method comprising:
    obtaining a suspension displacement value from at least one of the plurality of suspension displacement sensors;
    estimating a spring force based on the suspension displacement value, wherein the spring force is the force acting on a spring of the suspension element;
    estimating a damper force based on the suspension displacement value, wherein the damper force is the force acting on a damper of the suspension element;
    estimating a force at the center of the wheel based on an acceleration of a center of the wheel and an unsprung mass of the vehicle, where the acceleration of the center of the wheel is a second order derivative of the suspension displacement value with respect to time; and
    determining the normal force at the wheel of the vehicle based on the spring force, the damper force and the force at the center of the wheel of the vehicle.

2. The method according to claim 1 wherein the spring force is obtained from an arranged set of data, wherein the arranged set of data is a representation of a set of spring force values corresponding to a set of suspension displacement values.

3. The method according to claim 2 wherein the arranged set of data is provided by a table.

4. The method according to claim 2 wherein the arranged set of data is provided by a graph.

5. The method according to claim 1 wherein the damper force is obtained from an arranged set of data, wherein the arranged set of data is a representation of a set of damper force values corresponding to a set of a damper velocity values.

6. The method according to claim 5 wherein the arranged set of data is provided by a table.

7. The method according to claim 5 wherein the arranged set of data is provided by a graph.

8. The method according to claim 5 wherein the damper velocity is a first order derivative of the suspension displacement value with respect to time.

9. The method according to claim 1 wherein the normal force at the wheel is given by the equation:

$$F_N = m_U \ddot{z} + F_S + F_D$$

where $F_N$ is the normal force of the wheel, $m_U$ is the unsprung mass of the vehicle, $F_S$ is the spring force and $F_D$ is the damper force.

10. A method for estimating a vertical acceleration of a vehicle, the vehicle comprising a plurality of suspension displacement sensors with each of the plurality of suspension displacement sensors positioned proximal to a suspension element of the vehicle, the method comprising:
    obtaining a suspension displacement value from at least one of the plurality of suspension displacement sensors;
    estimating a spring force based on the suspension displacement value, wherein the spring force is the force acting on a spring of the suspension element, wherein the spring force is obtained from an arranged set of data, wherein the arranged set of data is a representation of a set of spring force values corresponding to a set of suspension displacement values;
    estimating a damper force based on the suspension displacement value, wherein the damper force is the force acting on a damper of the suspension element; and
    determining the vertical acceleration of the vehicle based on the spring force and the damper force, wherein the vertical acceleration of the vehicle is given by:

$$m_{vehicle} a_z = -m_{vehicle} g + \sum_{i=1}^{4} F_{corner_i}$$

where $m_{vehicle}$ is the mass of the vehicle, $a_z$ is the vertical acceleration of the vehicle, g is acceleration due to gravity, and $F_{corner_i}$ is a force acting on a corner of the vehicle and is given by:

$$F_{corner_i} = F_S + F_D$$

where $F_S$ is the spring force and $F_D$ is the damper force, and where the mass of the vehicle is estimating using the above $m_{vehicle} a_z$ equation when the vehicle is at a standstill condition.

11. The method according to claim 10 wherein the arranged set of data is provided by a table.

12. The method according to claim 10 wherein the arranged set of data is provided by a graph.

13. The method according to claim 10 wherein the damper force is obtained from an arranged set of data, wherein the arranged set of data is a representation of a set of damper force values corresponding to a set of damper velocity values.

14. The method according to claim 13 wherein the arranged set of data is provided by a table.

15. The method according to claim 13 wherein the arranged set of data is provided by a graph.

16. The method according to claim 13 wherein the damper velocity is a first order derivative of the suspension displacement data with respect to time.

17. A method for facilitating ride and stability control of a vehicle by determining a normal force at a wheel of the vehicle and vertical acceleration of the vehicle, the method comprising:
    obtaining a suspension displacement value from at least one of the plurality of suspension displacement sensors;
    estimating a spring force based on the suspension displacement value, wherein the spring force is the force acting on a spring of the suspension element;

estimating a damper force based on the suspension displacement value, wherein the damper force is the force acting on a damper of a suspension element;

estimating a force at the center of a wheel based on an acceleration of a center of the wheel and an unsprung mass of the vehicle, where the acceleration of the center of the wheel is a second order derivative of the suspension displacement value with respect to time; and determining a normal force at the wheel of a vehicle and a vehicle vertical acceleration of the vehicle based on the spring force, the damper force, the force at the center of the wheel of the vehicle, a mass of the vehicle and an acceleration of the center of the wheel of the vehicle.

18. The method according to claim 17 wherein the spring force is obtained from an arranged set of data, wherein the arranged set of data is a representation of a set of spring force values corresponding to a set of suspension displacement values.

19. The method according to claim 17 wherein the damper force is obtained from an arranged set of data, wherein the arranged set of data is a representation of a set of damper force values corresponding to a set of a damper velocity values.

20. The method according to claim 17 wherein the normal force at the wheel is given by the equation:

$$F_N = m_U \ddot{z} + F_S + F_D$$

where $F_N$ is the normal force of the wheel, $m_U$ is the unsprung mass of the vehicle, $F_S$ is the spring force and $F_D$ is the damper force.

* * * * *